United States Patent [19]
Molina

[11] 3,716,494
[45] Feb. 13, 1973

[54] DYE PENETRANT REMOVER

[75] Inventor: Orlando G. Molina, Westminster, Calif.

[73] Assignee: North Americana Rockwell Corp., and Air Products and Chemical, Inc., Allentown, Pa., part interest to each

[22] Filed: Feb. 25, 1971

[21] Appl. No.: 118,980

Related U.S. Application Data

[63] Continuation-in-part of Ser. No. 606,593, Jan. 3, 1967, abandoned.

[52] U.S. Cl. ..............252/408, 252/162, 252/164, 252/166, 252/168, 252/169, 252/171, 252/317
[51] Int. Cl. ..................G01n 21/16, G01n 21/38
[58] Field of Search..............252/408, 89, 162–164, 252/166, 168, 169–171, 315, 317

[56] References Cited

UNITED STATES PATENTS

| | | |
|---|---|---|
| 3,115,471 | 12/1963 | Matuska.............................252/170 |
| 2,960,467 | 11/1960 | Martinek.........................252/317 X |
| 2,953,530 | 9/1960 | Switzer...........................252/408 X |
| 2,405,078 | 7/1946 | Ward...............................252/301.2 |
| 2,478,951 | 8/1948 | Stokely................................252/408 |
| 1,580,914 | 4/1926 | Phillips................................252/170 |
| 1,875,552 | 9/1932 | Bateman.........................252/170 X |
| 2,395,085 | 2/1946 | Woodside.......................252/162 X |
| 3,062,749 | 11/1962 | Herrling.............................252/170 |
| 3,251,779 | 5/1966 | Williams............................252/170 |

*Primary Examiner*—Robert F. Burnett
*Assistant Examiner*—M. E. McCamish
*Attorney*—L. Lee Humphries

[57] ABSTRACT

Viscous compositions of gel-like consistency are disclosed for removing excess dye penetrant from parts subjected to liquid dye penetrant inspection. The compositions comprise a cleaner, a carrier, and a viscosity increasing agent, and have a viscosity between 10 and 100 poises at 100 reciprocal seconds.

4 Claims, No Drawings

DYE PENETRANT REMOVER

This application is a continuation-in-part of previously filed and copending patent application Ser. No. 606,593 filed Jan. 3, 1967, now abandoned.

BACKGROUND OF THE INVENTION

The process of dye penetrant inspection is a well-known nondestructive inspection technique. Broadly, it comprises three steps. The first step is the application of liquid dye penetrant to the part to be inspected either by dipping, brushing or spraying. The dye penetrant, in addition to coating the surface of the part, penetrates any cracks, surface flaws or fissures in the part. The second step is the removal of excess dye penetrant by superficially cleaning the surface of the part, allowing residual dye penetrant to remain in any cracks or defects which exist in the stated surface. The third step is the developing of the dye penetrant by application of a developer coating to cause the mentioned residual dye penetrant remaining in surface defects to form a visible pattern or trace in the stated coating. Where the dye penetrant is clearly visible without any developer, the foregoing third step is omitted.

The removers used in the prior art to accomplish the process of the second step above are mobile liquids. Mobile liquid dye penetrant removers have several disadvantages. In general, the amount of dye penetrant removed is a function of the time that the remover is on the part. The remover must consequently be used with great skill and care or it will remove the residual dye penetrant in the flaws of the part, in addition to the undesirable dye penetrant on the surface of the part, resulting in a total absence of any dye trace in the developer coating. Additionally, if a large surface is not planar and horizontal, run-off of remover will cause uneven removal of dye penetrant. An additional disadvantage of a mobile liquid remover is apparent when parts, whether large or small, must be coated on their underside, due to a fixed location in an assembly. In such a fixed location, remover drips from the part, making the process inconvenient, messy and imprecise.

SUMMARY OF THE INVENTION

The objects of this invention are accomplished by the use of a novel one-phase viscous dye penetrant remover. The one-phase viscous dye penetrant removers of the instant invention comprise a dye penetrant cleaner, a viscosity increasing agent, and a carrier. These removers have an apparent viscosity between 10 and 100 poises at 100 reciprocal seconds. The preferred remover comprises water, a nonionic detergent, and water soluble pine oil.

DESCRIPTION OF THE PREFERRED EMBODIMENT

Dye penetrants with ketone, hydrocarbon, glycol or chlorinated hydrocarbon bases have proved successful in the prior art. However, dye penetrants based upon acetone, benzene, or other solvents, both oil based and spirit type, are known to be feasible. Water is generally not suitable for a dye penetrant base, as its high surface tension renders it unsuitable for penetration of narrow or microscopic cracks. Whatever base dye penetrant is chosen, the remover must naturally be one which will remove the excess dye penetrant. The critical requirements of the dye penetrant cleaner contemplated in this case are that the cleaner must be capable of removing the dye penetrant, either by dissolution or emulsification, that it be miscible with the rest of the remover system, and that it be compatible with a highly viscous system. The particular agent chosen would be selected with the characteristics of the dye penetrant and the rest of the remover system in mind.

Cleaners found suitable for use in the instant invention have included water dispersible pine oil, methyl ethyl ketone and gasoline. These have been found effective in the removal of dye penetrants comprising organic dyes and methyl chloroform and penetrants comprising organic dyes and methyl isobutyl ketone, or oily and oil-like vehicles.

The viscosity increasing agents of the instant invention can be of such a nature that the remover becomes a highly viscous liquid, or such that the remover becomes a gel. For the purposes of this specification, a gel is a semi-liquid which has a definitely ascertainable yield shear strength. Whether the remover is a gel or a liquid, it should have a viscosity large enough such that when the viscous remover is applied to the part to be inspected, the remover will not flow into cracks, fissures, and flaws in the part. That is, the remover will contact only surface or excess dye penetrant and will not penetrate defects so as to remove dye in defects in the part. Naturally, the viscosity level required to avoid penetration of defects in a part depends upon the width of the defect. For weld inspection purposes, where cracks as small as 5 microns in width must be detected, a minimum apparent viscosity of 10 poise is suitable. It can be seen that the upper limit of viscosity is set by the simple consideration of ease of application. With ease of application being the principal criteria for the upper limit of viscosity, quite high viscosities, for instance, 100 poise or even higher are suitable.

The viscosity increasing agent of this invention must meet some of the same requirements that the cleaner satisfies. The viscosity increasing agent must be compatible with the remover system such that a homogeneous liquid or gel is formed. Accordingly, the nature of the dye penetrant, cleaner and carrier must be kept in mind when specifying a suitable viscosity increasing agent. For instance, in a system using methyl isobutyl ketone based dye, pine oil cleaner, and water carrier, a nonionic detergent such as Tergitol NPX, sold by Union Carbide, is a suitable viscosity increasing agent, producing a gelled dye penetrant remover. For other systems, other viscosity increasing agents would be more suitable. For example, pyrogenic silica, cellulose ether, soaps, fine particle alumina, gums and soluble high molecular weight polymers are viscosity increasing agents known in the prior art. Pyrogenic silica can be used in combination with a water-soluble pine oil, a nonionic surfactant and distilled water. The exact composition of the viscosity increasing agent is not critical; its nature is. Any composition would be suitable, as long as it is compatible with the rest of the remover system and increases the viscosity of the system. Tergitol nonionic NPX is a nonyl phenyl polyethylene glycol ether containing 10.5 mols of ethylene oxide and having the general formula $C_6H_{10}O(CH_2O)$ 10.5H.

The third component of the novel dye penetrant remover of the instant invention is a carrier. Water is the most common carrier, being the most inexpensive. The carrier, like the cleaner and the viscosity increasing agent, must be selected with the nature of the dye penetrant and the rest of the remover system in mind. It has been found that the most economical systems are based upon water, although a suitable system may comprise, for instance, alcohol as a carrier, a viscosity increasing agent capable of gelling alcohol, for instance, pyrogenic silica, and a cleaning agent, such as methyl isobutyl ketone. This system would be suitable for removing excess dye penetrant that is soluble in alcohol. It will be noted that ungelled alcohol would remove all the dye penetrant from most surface defects, including very narrow flaws and would be unsuitable according to the teachings of this invention because of this excessive cleaning effect.

The primary requirements for a carrier to be used in the instant invention is that the carrier be miscible and compatible with the viscosity increasing agent and cleaner. As indicated previously, a water carrier is preferred, but it is also to be understood that other carriers are within the scope of the instant invention. Such carriers include alcohol, chlorinated hydrocarbons, benzene and gasoline.

Although the three major components of the dye penetrant remover of the instant invention have been designated as carrier, cleaner and viscosity increasing agent, each can, to some degree, perform the function of the other. For instance, in a system comprising pine oil, nonionic detergent and water, the water is nominally the carrier; the detergent, the viscosity increasing agent; and the pine oil, the cleaning agent. However, it should be noted that in this system the nonionic detergent also performs a cleaning function in addition to its nominal viscosity increasing function. Accordingly, a system can be formulated that only has two components, one of the two components serving two functions. An example of such a system would be methanol and Klucel, a tradename for a cellulose ether produced and sold by Hercules Powder Co. In this system, the methanol would act as both a carrier and a cleaner. The preferred remover system, suitable for most dye penetrants, comprises from 1 to 2 parts by weight water soluble pine oil, from 1 to 2 parts by weight nonionic detergent and from 1 to 8 parts by weight water. Pine oil, as understood by those skilled in the art, includes terpene alcohols or their derivatives, principally isomeric tertiary and secondary cyclic terpene alcohols, ketones and ethers with relatively high boiling terpene hydrocarbons.

Once the improved remover is formulated, its use is similar to that of prior art removers. The part to be inspected is coated with dye penetrant, and the dye penetrant is allowed to penetrate. For rapidity of inspection, dye penetrants based on volatile solvents are preferred. After the dye penetrant has penetrated, the viscous remover of the instant invention is applied to the part. It is at this point that the remover's improvement on the prior art becomes manifest. The remover need not be immediately removed. Since the viscous remover does not penetrate the flaws, there is no chance of the dye therein being removed. At some later time, then, the remover is cleaned off the part, and the dye remaining in the flaws is developed. An additional advantageous feature of the compositions of the instant invention is a novel variable sensitivity. The system can be so designed that additional carrier can be added, making the remover less sensitive. It should be noted that the addition of carrier will make the remover less viscous. This will enable the remover to penetrate flaws previously inaccessible. This effect is generally outweighed by the decreased strength of the remover due to the further diluting of the cleaner.

The following examples illustrate the composition of the instant invention; all compositions are given in parts by weight.

EXAMPLE I

A dye penetrant remover was formulated of 3 parts water, 1 part of Tergitol NPX, described above and designating a nonionic detergent made and sold commercially by Union Carbide Corp., and 1 part of water soluble pine oil. Water soluble pine oil is a commercially available formulation that comprises pine oil and a nonionic detergent so formulated that the pine oil composition will emulsify very readily in water.

The remover, a gel, was applied to a flawed weldment that had previously been treated with a chlorinated hydrocarbon based dye penetrant. After three minutes, the remover and surface dye penetrant was washed off with water. A developer was then applied, revealing flaws in the weldment.

EXAMPLE II

A remover formulation identical to that of Example I was applied to a dyed weldment similar to that of Example I. The remover was allowed to stand for 72 hours, and then washed off with water. Application of developer revealed the same size and type of flaws in the weldment as were detected in Example I.

EXAMPLE III

A remover composition was formulated using 8 parts of water, 1 part of Triton X-155, a tradename for a nonionic detergent sold by Rohm and Haas, and 1 part of water soluble pine oil. This less viscous remover composition was applied to a dyed defective weldment of the type used in Example I. After five minutes, the composition was washed away with water. More flaws were evident than in the previous two examples, indicating an increased sensitivity in the less viscous remover.

EXAMPLE IV

A remover composition was formulated using 98 parts of methanol, and 2 parts of Klucel. This composition was used to remove dried dye penetrant from the surface of a defective weldment. The remover was then wiped off the part. Subsequent development revealed flaws in the weldment. It will be noted that the methanol acted as both the cleaner and the carrier.

EXAMPLE V

A remover composition was formulated using 95 parts of acetone and 5 parts of Cab-O-Sil N5, a tradename for pyrogenic silica produced and sold by Cabot Corp. This gelled composition was used to remove dried dye penetrant from the surface of a defective weldment. The remover was then wiped off the part. Subsequent development revealed flaws in the weldment. It will be noted that the acetone acts as both the cleaner and the carrier.

I claim:

1. A highly viscous water-washable cleaning agent of gel-like consistency for removing excess liquid dye penetrant from a specimen surface without penetrating the minute surface defects and removing the residual dye entrapped therein thereby producing a dye pattern defined by the residual dye entrapped within the minute defects in such surface, said agent consisting of:

from 1 to 2 parts by weight of a water-soluble pine oil, from 1 to 2 parts by weight of a nonionic surfactant, and from 1 to 8 parts by weight of distilled water, and either an amount of a viscosity increasing material or said surfactant being selected so as to cause said agent to have a viscosity between 10 and 100 poises at 100 reciprocal seconds.

2. The agent set forth in claim 1 above wherein said viscosity increasing material consists of pyrogenic silica.

3. The agent set forth in claim 1 above, wherein:

said nonionic surfactant consists of a nonyl phenyl polyethylene glycol ether containing about 10.5 mols of ethylene oxide.

4. A highly viscous water-washable cleaning agent of gel-like consistency for removing excess liquid dye penetrant from a specimen surface without penetrating the minute surface defects and removing the residual dye entrapped therein thereby producing a dye pattern defined by the residual dye entrapped within the minute defects in such surface, said agent consisting of:

from 1 to 2 parts by weight of a water-soluble pine oil, from 1 to 2 parts by weight of a nonionic surfactant, and from 1 to 8 parts by weight of distilled water, said surfactant causing said agent to have a viscosity between 10 and 100 poises at 100 reciprocal seconds.

* * * * *